United States Patent
Mehta et al.

(10) Patent No.: US 7,720,925 B1
(45) Date of Patent: *May 18, 2010

(54) MULTIPLE MESSAGE RECEIVE ROUTINE FOR NETWORK PACKETS

(75) Inventors: Ashish Kishorchandra Mehta, Fremont, CA (US); Cahya Adiansyah Masputra, Millbrae, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1323 days.

This patent is subject to a terminal disclaimer.

(21) Appl. No.: 11/195,938

(22) Filed: Aug. 3, 2005

(51) Int. Cl.
*G06F 15/16* (2006.01)

(52) U.S. Cl. ................ 709/207; 709/250

(58) Field of Classification Search .......... 709/207, 709/250; 719/313, 319
See application file for complete search history.

(56) References Cited

U.S. PATENT DOCUMENTS

| | | | | |
|---|---|---|---|---|
| 5,222,217 A | * | 6/1993 | Blount et al. ............ 707/204 |
| 6,163,812 A | * | 12/2000 | Gopal et al. ............ 719/310 |
| 2003/0037178 A1 | * | 2/2003 | Vessey et al. ........... 709/319 |
| 2007/0011687 A1 | * | 1/2007 | Ilik et al. ............... 719/313 |

* cited by examiner

*Primary Examiner*—Ramy M Osman
*Assistant Examiner*—Marshall McLeod
(74) *Attorney, Agent, or Firm*—Osha • Liang LLP

(57) ABSTRACT

A method for receiving a plurality of messages that includes obtaining the plurality of messages, grouping the plurality of messages into a data structure, generating a system call from a user-level application to a kernel, wherein the system call includes a request for the plurality of message, and returning a reference to the data structure to the user-level application in response to the request, and for each message in the plurality of messages in the data structure: extracting a selected message from the plurality of messages in the data structure using the reference to the data structure by the user-level application, and consuming the selected message by the user-level application.

20 Claims, 4 Drawing Sheets

MULTIPLE MESSAGE RECEIVE ROUTINE FOR NETWORK PACKETS

BACKGROUND

A distributed computer system typically includes a number of interconnected nodes. Each nodes typically includes a processor and memory. In addition, the nodes typically include the necessary hardware and software to communicate with other nodes in the distributed system.

Nodes in the distributed computer system may be separated into a user level space (in which the user-level applications (such as internet browsers) operate) and a kernel space. The separation allows for stability and security in the system and for the user-level application to operate without requiring knowledge of the underlying hardware. For example, the kernel may send and receive a message from the network and process the message for the user-level application. Processing a message may involve translating the message from received signals from the network, determining the application receiving the message, coordinating the message passing with the sending node, etc.

When the user-level application wants to receive a message, the user-level application makes a request to the kernel (i.e., a system call) that may contain a socket descriptor, a pointer to a message structure for storing the message, the length of the message, any flags required when receiving the message, etc. The socket descriptor may identify a socket, which is often created prior to the receive request. A socket defines the endpoints of a connection. Specifically, when two user-level applications on two different nodes communicate, each of the user-level applications has a dedicated socket. As the sockets are dedicated, messages sent to the socket associated with a user-level application are only for the user-level application. The flags specify any special condition upon which to send the message.

Often, a user-level application has several messages to receive. These messages may be received from several clients or received from a single application. Each message requires a separate system call. Thus, the system call returns with each message individually to be consumed by the user-level application individually. With each system call, overhead is associated with the system call. This overhead may be derived from context switching, memory accesses, translation lookaside buffer (TLB) flushes, etc.

Often messages arrives at a greater rate than the user-level application can consume. When this occurs, messages are queued at the socket layer. The message queue at the socket layer may have a low water mark and a high water mark. The low water mark indicates that the user-level application has consumed enough messages and is ready to receive more messages. The high water mark indicates that the user-level application has messages arrive at the node at a rate faster than the user-level application is able to consume. In order to avoid unnecessary storage, when the number of messages reaches the high water mark, messages may be deleted. Specifically, rather than processing received messages for an application which has a message queue at the high water mark, the kernel may simply deletes the messages. Thus, the messages have to be resent from the sending node. Network bandwidth is wasted because messages are being sent and not processed. Therefore, throughput, or the amount of messages that are sent and processed at a time, decreases for all applications.

SUMMARY

In general, in one aspect, the invention relates to a method for receiving a plurality of messages that includes obtaining the plurality of messages, grouping the plurality of messages into a data structure, generating a system call from a user-level application to a kernel, wherein the system call includes a request for the plurality of message, and returning a reference to the data structure to the user-level application in response to the request, and for each message in the plurality of messages in the data structure: extracting a selected message from the plurality of messages in the data structure using the reference to the data structure by the user-level application, and consuming the selected message by the user-level application.

In general, in one aspect, the invention relates to a system for receiving a plurality of messages that includes a kernel for obtaining the plurality of messages, grouping the plurality of messages into a data structure, and returning a reference to the data structure to the user-level application in response to a request from a user-level application, wherein a system call includes the request for a plurality of messages, and the user-level application for extracting a selected message from the plurality of messages in the data structure using the reference to the data structure and consuming the selected message for each message in the plurality of messages in the data structure.

In general, in one aspect, the invention relates to a computer usable medium having computer readable program code embodied therein for causing a computer system to execute a method for receiving a plurality of messages that includes obtaining the plurality of messages, grouping the plurality of messages into a data structure, generating a system call from a user-level application to a kernel, wherein the system call includes a request for the plurality of message, and returning a reference to the data structure to the user-level application in response to the request, and for each message in the plurality of messages in the data structure: extracting the selected message from the plurality of messages in the data structure using the reference to the data structure by the user-level application, and consuming the selected message by the user-level application.

Other aspects and advantages of the invention will be apparent from the following description and the appended claims.

DETAILED DESCRIPTION

Figure 1:
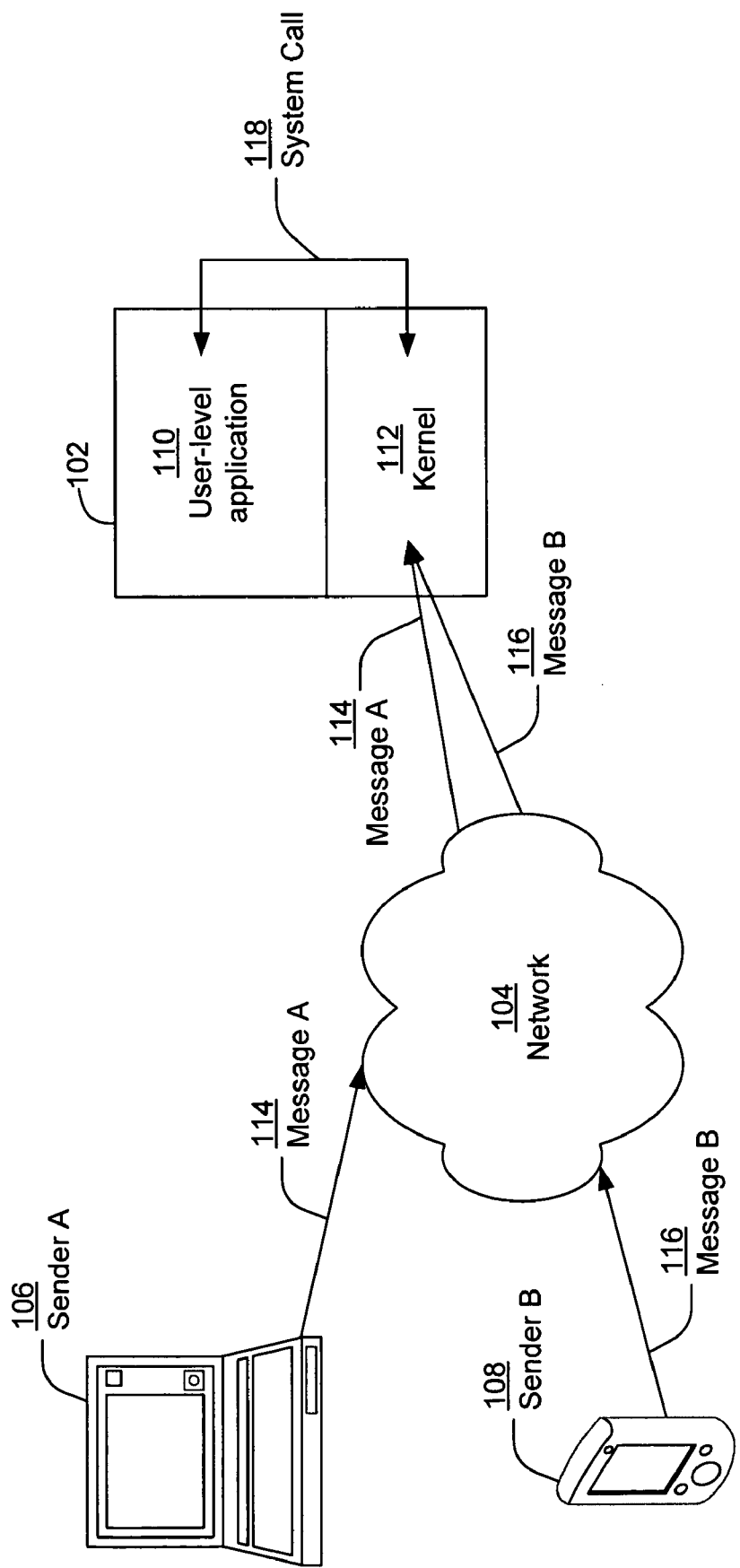
FIG. 1 shows a system architecture in accordance with one embodiment of the invention.

Exemplary embodiments of the invention will be described with reference to the accompanying drawings. Like items in the drawings are shown with the same reference numbers. Further the use of "ST" in the figures corresponds to "Step" in the detailed description below.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention related to receiving multiple messages. More specifically, embodiments of the invention allow for the user-level application to receive multiple messages in a single system call. These messages may or may not be sent from the same sender. Additionally, embodiments of the invention provide a method for efficient use of resources when receiving multiple messages.

FIG. 1 shows a system architecture in accordance with one embodiment of the invention. The system architecture includes the following components: sender A (106), sender B (108), message A (114), message B (116), network (104), and computer system (102). Each of these components is described in detail below.

In accordance with one embodiment of the invention, sender A (106) and sender B (108) are devices which are connected to a network (104). Sender A (106) and sender B (108) may be a laptop computer, desktop computer, Personal Digital Assistant, telephone, embedded computer (such as those found in automobiles, appliances, etc.) or any other device which may be connected to the network (104). Further, those skilled in the art will appreciate that while FIG. 1 shows two senders, sender A (106) and sender B (108), there may be only a single sender with functionality to send multiple messages (114, 116), or there may be multiple senders with functionality to send multiple messages (114, 116).

Message A (114) and message B (116) contain data to communicate from sender A (106) and sender B (108) to the computer system (102). Those skilled in the art will appreciate that message A (114) and message B (116) may be a part of a complete message, such as a datagram or a packet, or may be a complete message. Messages A (114) and message B (116) may be sent using Transmission Control Protocol (TCP) or User Datagram Protocol (UDP). TCP ensures that messages sent from the sender arrive at the receiver in the order the messages (114, 116) were sent. UDP does not guarantee delivery of messages (114, 116) or the same order of the messages as the messages (114, 116) were sent. In accordance with one embodiment of the invention, message A (114) and/or message B (116) have a message header and a message body. The message header may include, for example, an address associated with a computer system (102), the address of the sender, error checking information, information to process the message (114, 116), etc. The address associated with the computer system (102) may be the network address of computer system (102) or an address associated with multiple recipients in which one recipient is computer system (102), such as in the case of multicasting. Alternatively, message A (114) and/or message B (116) may be sent in the form of a broadcast in which every device on the network (104) receives the message (114, 116). The message body contains the data to communicate from sender A (106) or sender B (108) to the computer system (102).

Continuing with FIG. 1, the network in accordance with one embodiment of the invention, is an interconnection of computers and related devices. Using the interconnection, the network includes functionality to transfer messages (114, 116) from sender A (106) and sender B (108) to computer system (102). The network may be a wide area network (WAN) such as the Internet, a local area network (LAN), system area network, etc., or a combination of different networks. Further, the network may be implemented using virtually any network topology (i.e., ring, star, tree, mesh). The network may also include one or more routers for passing messages (114, 116). Routers include functionality to forward the message (114, 116) from sender A (106) and sender B (108) to computer system (102).

The computer system (102) in accordance with one embodiment of the invention, is the recipient of message A (114) and message B (116). The computer system (102) may be implemented using any device that receives messages (114, 116), such as a cell phone, personal digital assistant, embedded computer, personal computer, laptop computer, etc. Further computer system (102) may include a kernel (112) and a user-level application (110). In accordance with one embodiment of the invention, the user-level application (110) may include functionality to generate system call (118). The system call (118) may include the number of messages (114, 116) the user-level application may receive, flags, a pointer to a message structure, a socket descriptor, etc. In accordance with one embodiment of the invention, the socket descriptor may identify a socket associated with the user-level application. By using a single system call (118) for receiving multiple messages, greater performance gain may be achieved. Specifically, the overhead associated with a system call is endured only once for the messages that a user-level application receives in the return from the system call. The flags may include, for example, an indication of blocking or non-blocking, a command to peek at the messages (114, 116), or an error checking request. In accordance with one embodiment of the invention, blocking means that the user-level application waits until the message arrives before continuing processing. In accordance with one embodiment of the invention, non-blocking allows the user-level application to continue processing. When the message arrives, an signal is sent to the user-level application.

The kernel (112) is operatively connected to the network (104). The kernel (112), in accordance with one embodiment of the invention, is the central module of an operating system. The kernel (112) may be responsible for resource allocation, low-level hardware interfaces, security, etc. Those skilled in the art will appreciate that in accordance with one embodiment of the invention, other parts of the operating system may also be used to perform the tasks as described above. Further, in one embodiment of the invention, the kernel may also be considered a micro-kernel or a monolithic kernel.

In accordance with one embodiment of the invention, the kernel includes functionality to re-format message A (114) and message B (116) into a format that user-level application (110) may read. The kernel may also include functionality to combine message A (114) and message B (116) into a single data structure to return to the user-level application (110). In one embodiment of the invention, the kernel returns a reference to the data structure when the kernel processes the system call (118). A reference to a data structure may correspond, for example, to a pointer to the data structure, an indirect pointer to the data structure, the data structure itself, etc. In one embodiment, the kernel may use an signal containing the data structure.

Figure 2:
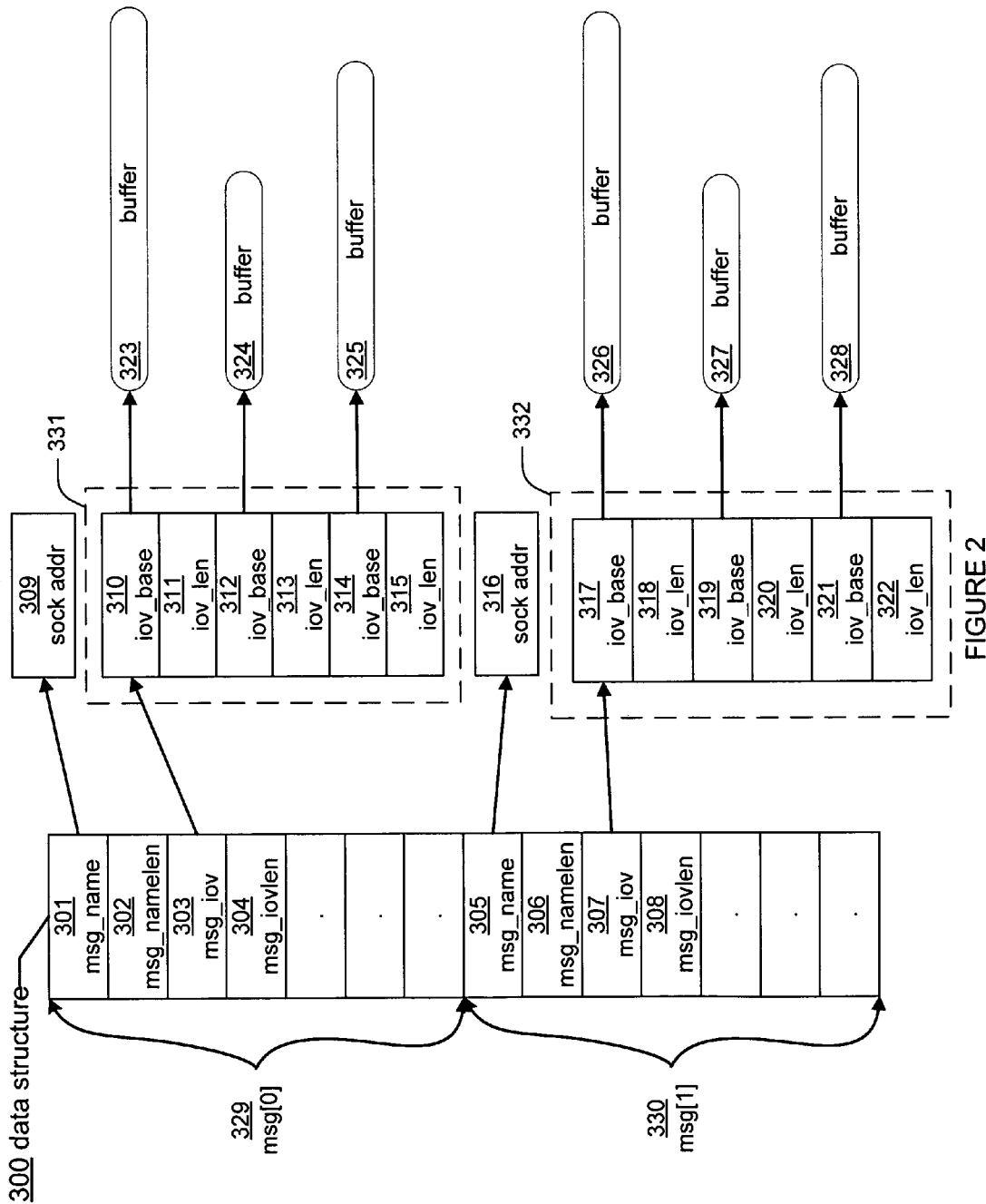
FIG. 2 shows a data structure used in the system call in accordance with an embodiment of the invention.

FIG. 2 shows an exemplary data structure (300) in accordance with an embodiment of the invention. In one embodiment of the invention, the data structure (300) may be an array, vector, link list, etc. Each message (329, 330) in the data structure (300) may include a message header and a message body. The message header describes a socket and a message body containing the received data. The socket defines the endpoints for a connection. Specifically, the socket may describe the sender's address, the sender's port number, a local address, and a local port number in accordance with one embodiment of the invention. Using the addresses and port numbers described by the socket, remote applications may communicate. Further, the socket may be associated with multiple senders, such as when the user-level is receiving connection requests from the senders. In one embodiment of the invention, the socket may be described by a msg_name (301, 305) and msg_namelen (302, 306). Msg_name (301, 305) contains a reference to a socket address (309, 316) and msg_namelen (302, 306) contains the size of the socket address (309, 316).

In one embodiment of the invention, the message body is associated with one or more message buffers (e.g., 323, 324, 325, 326, 327, 328). Further, each message (329, 330) may have an input/output vector (331, 332) containing the references to the message buffers (e.g., 323, 324, 325, 326, 327, 328) containing the data. This level of indirection allows for variable length messages and allows for the user-level application to divide the message. The input/output vector (331, 332) is described by msg_iov (303, 307) and msg_iovlen (304, 308). Msg_iov (303, 307) contains the memory address of the input/output vector (331, 332). Msg_iovlen (304, 308) contains a number of buffers (e.g., 323, 324, 325, 326, 327, 328) referred to by the input/output vector. The input/output vector (331, 332) contains the base address (e.g., 310, 312, 314, 317, 319, 321) of each message buffer (e.g., 323, 324, 325, 326, 327, 328) and the size (e.g., 311, 313, 315, 318, 320, 322) of each message buffer (e.g., 323, 324, 325, 326, 327, 328). This data structure may be used by the kernel to send the messages to the user-level application.

Figure 3:
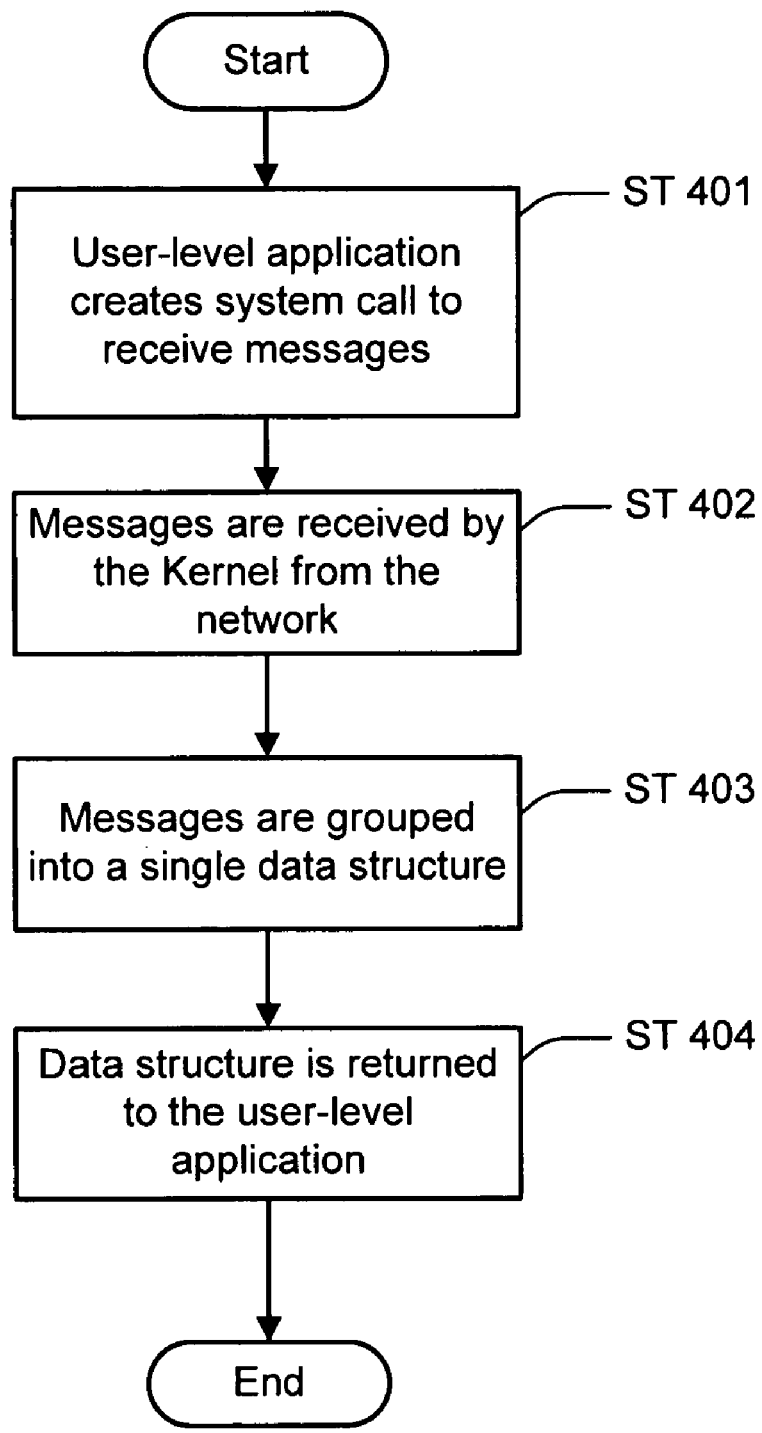
FIG. 3 shows a flowchart for receiving messages in accordance with one embodiment of the invention.

FIG. 3 shows a method for receiving multiple messages in accordance with an embodiment of the invention. Initially, in accordance with one embodiment of the invention, the user-level application generates a system call to receive the messages (ST 401). Those skilled in the art will appreciate that the creation of the socket(s) may be requested as part of the system call with an address specifying the sender or requested prior to the system call. Further, in one embodiment of the invention, a system call may not be used, as the kernel signals the user-level application when a message is received. The system call may also specify a message structure containing message buffers. Memory for the messages buffers may be allocated to the user-level application prior to the message being received. Alternatively, memory for the message buffers may be allocated at the time the message arrives from the kernel memory pool.

Continuing with FIG. 3, next, messages are received by the kernel from the network (ST402). The kernel may then process the messages (not shown). In accordance with one embodiment of the invention, processing messages may involve following the Open Systems Interconnection (OSI) model.

The OSI model uses a layered approach for processing messages. Each layer is responsible for performing certain functions. In accordance with one embodiment of the invention, there are six layers in the OSI model. Those skilled in the art will appreciate that there may be more or less layers depending on the implementation. The physical layer translates each message from the signal that arrives on the network into a bit stream. The network layer turns the bit stream into packets of data and resolves problems related to data transmissions between heterogeneous networks. The transport layer turns packets into messages by reassembling the partitioned messages into complete messages. When TCP is used and the message is not delivered as a continuous byte stream, then in one embodiment of the invention, each message has a sequence number. Thus, transport layer may reassemble the messages and sends an acknowledgement of the arrival of the message. Further, the network layer may store the messages into the message buffers (as described in FIG. 2). The socket layer also identifies the socket from the port information provided in the header of the message. In one embodiment of the invention, the above described layers are implemented by the kernel.

As described above, the socket defines the user level application to which the message belongs. In accordance with one embodiment of the invention, the socket layer may store the messages in a message queue for the user-level application. Upon receiving a system call from a user-application for the user-level application to receive messages, the socket layer may group the messages into a single data structure (ST 403). Next, the data structure is returned to the user-level application (ST 404). As part of returning the data structure to the user-level application, message buffers may be copied from the kernel address space to the user-level address space.

If the system call specifies the number of messages that the user-level application may receive, then in one embodiment of the invention, the socket layer may wait until the specified number has arrived in the message queue for the socket address. Alternatively, as messages are received from the network and processed, the messages may be grouped into a data structure and returned to the user-level application with an indication of the number of messages received.

When the user-level application receives the data structure, in accordance with one embodiment of the invention, the messages are extracted individually from the data structure.

In accordance with one embodiment of the invention, the data structure may have a fixed length number of references for each message. In order to extract a message, the user-level application determines the end of a message in the data structure through a fixed number of references for each message. The user-level application keeps a count of the number of message received, and when the count value is the same as in the system call, all of the messages are deemed processed. Alternatively, the user-level application may simply continuously process messages until the user-level application has arrived at the end of the data structure.

Alternatively, in one embodiment of the invention, each message in the data structure may contain variable length messages and have a size description of each message. In this embodiment, the user-level application may extract the message according to the size of the message. Next, the user-level application process the message.

In order to process the message, the user-level application may gather the contents of the message from different message buffers, reformat the message into the application specific format, decrypt the message, extract the message from a compressed format, such as in a zip file, or perform other functions on the message.

Figure 4:
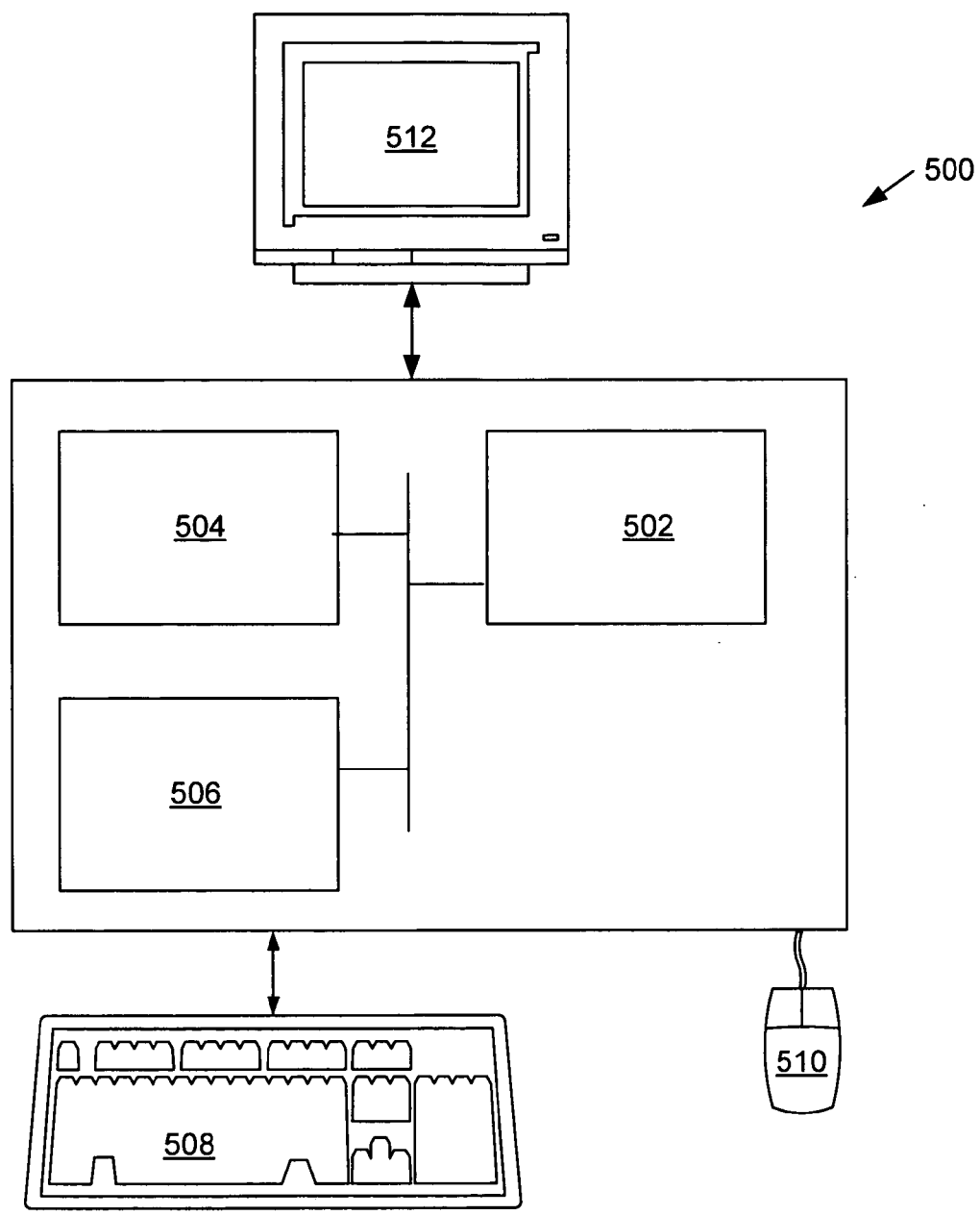
FIG. 4 shows a computer system in accordance with one embodiment of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500)

may be located at a remote location and connected to the other elements over a network. Further, the invention may be implemented on a distributed system having a plurality of nodes, where each portion of the invention (e.g., the user level application, the data structure, the kernel, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

The present invention may include one or more of the following advantages. Performance gain of the user-level application only creating one system call in order to receive multiple messages may be achieved. Specifically, the overhead associated with a system call is endured only once for all of the messages that a user-level application receives. Additionally, as the user-level application may receive several messages at a time, fewer messages may be deleted before the messages are processed. With few messages deleted from the system, throughput may be increased for all user-level applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for receiving a plurality of messages comprising:
    obtaining the plurality of messages from a physical network, wherein the plurality of messages are sent by a plurality of senders;
    grouping, by the kernel, the plurality of messages into a data structure, wherein the plurality of messages are grouped into the same data structure;
    generating a system call from a user-level application to the kernel, wherein the system call comprises a request for the plurality of message; and
    returning, by the kernel, a reference to the data structure to the user-level application in response to the request; and
    for each message in the plurality of messages in the data structure:
        extracting, by the user-level application, a selected message from the plurality of messages in the data structure using the reference to the data structure, wherein the user-level application directly accesses the data structure to extract the message, and
        consuming, by the user-level application, the selected message.

2. The method of claim 1, wherein the plurality of messages comprises a message header and a message body.

3. The method of claim 2, wherein the message header comprises a socket descriptor.

4. The method of claim 2, wherein the message body indirectly references a plurality of message buffers.

5. The method of claim 1, wherein the system call comprises a count corresponding to a number of messages in the data structure and a flag.

6. The method of claim 1, wherein the system call comprises a socket for receiving the plurality of messages for the user-level application.

7. The method of claim 1, wherein the data structure is a vector.

8. The method of claim 1, wherein the selected message comprises a field storing a length of the selected message, and wherein the field storing the length of the selected message is used to extract the selected message.

9. A system for receiving a plurality of messages comprising:
    a kernel for:
        obtaining the plurality of messages from a physical network, wherein the plurality of messages are sent by a plurality of senders;
        grouping the plurality of messages into a data structure, wherein the plurality of messages are grouped into the same data structure; and
        returning a reference to the data structure to a user-level application in response to a request from the user-level application, wherein a system call comprises the request for the plurality of messages; and
    the user-level application for:
        extracting a selected message from the plurality of messages in the data structure using the reference to the data structure, wherein the user-level application directly accesses the data structure to extract the message; and
        consuming the selected message for each message in the plurality of messages in the data structure.

10. The system of claim 9, wherein each of the plurality of messages comprises a message header and a message body.

11. The system of claim 10, wherein the message header comprises a socket descriptor.

12. The system of claim 10, wherein the message body indirectly references a plurality of message buffers.

13. The system of claim 9, wherein the system call comprises a count corresponding to a number of messages in the data structure and a flag.

14. The system of claim 9, wherein system call comprises a socket for receiving the plurality of messages for the user-level application.

15. The system of claim 9, wherein the data structure is a vector.

16. The system of claim 9, wherein the selected message comprises a field storing a length of the selected message, and wherein the field storing the length of the selected message is used to extract the selected message.

17. A computer usable medium having computer readable program code embodied therein for causing a computer system to execute a method for receiving a plurality of messages comprising:
    obtaining, by a kernel, the plurality of messages from a physical network, wherein the plurality of messages are sent by a plurality of senders;
    grouping, by the kernel, the plurality of messages into a data structure, wherein the plurality of messages are grouped into the same data structure;
    receiving, by the kernel, a system call from a user-level application, wherein the system call comprises a request for the plurality of message; and
    returning a reference to the data structure to the user-level application in response to the request,
    wherein, for each message in the plurality of messages in the data structure, the user-level application:
        extracts the selected message from the plurality of messages in the data structure using the reference to the data structure, wherein the user-level application directly accesses the data structure to extract the message, and consumes the selected message.

18. The computer usable medium of claim 17, wherein system call comprises a socket for receiving the plurality of messages for the user-level application.

19. The computer usable medium of claim 17, wherein each of the plurality of messages comprises a message header and a message body.

20. The computer usable medium of claim 18, wherein the message header comprises a socket descriptor.

* * * * *